United States Patent [19]

Frutschi

[11] 4,163,365
[45] Aug. 7, 1979

[54] METHOD FOR REGULATING A POWER PLANT CONTAINING A GAS TURBINE ASSEMBLY AND APPARATUS FOR THE PERFORMANCE OF THE AFORESAID METHOD

[75] Inventor: Hansulrich Frutschi, Riniken, Switzerland

[73] Assignee: BBC Brown, Boveri & Company Limited, Baden, Switzerland

[21] Appl. No.: 851,279

[22] Filed: Nov. 14, 1977

[30] Foreign Application Priority Data

Dec. 2, 1976 [CH] Switzerland ............... 15174/76

[51] Int. Cl.² .................. F02C 3/06; F02C 9/14
[52] U.S. Cl. .................. 60/39.03; 60/39.18 R;
60/39.27; 60/39.18 A
[58] Field of Search ............... 60/39.18 A, 39.18 C,
60/39.18 B, 39.51 R, 39.52, 39.27, 39.29, 39.03;
415/52, 53 R, 56, 59, 11

[56] References Cited

U.S. PATENT DOCUMENTS

| | | | |
|---|---|---|---|
| 2,483,073 | 9/1949 | Strub | 60/39.18 C |
| 2,599,470 | 6/1952 | Meyer | 415/59 |
| 2,837,270 | 6/1958 | Chapman | 60/39.29 |
| 2,986,882 | 6/1961 | Pavlecka | 60/39.52 |
| 3,150,487 | 9/1964 | Mangan et al. | 60/39.18 B |
| 3,292,846 | 12/1966 | Harper et al. | 415/11 |
| 3,314,232 | 4/1967 | Hill | 60/39.18 C |
| 3,394,265 | 7/1968 | Hendrickson | 60/39.29 |
| 4,083,181 | 4/1978 | Adamson | 60/39.52 |

*Primary Examiner*—Robert E. Garrett
*Attorney, Agent, or Firm*—Werner W. Kleeman

[57] ABSTRACT

A method of, and apparatus for, regulating a power plant containing a gas turbine assembly operated in an open cycle which essentially comprises a compressor for the combustion air, a combustion chamber and a gas turbine. A heat exchanger is arranged following the turbine exhaust and in the heat exchanger there is utilized the thermal energy still contained in the exhaust gases of the gas turbine. In order to regulate the output of the gas turbine, a variable quantity of compressed air is returned into the flow path of the combustion air to a stage operating at a lower pressure.

6 Claims, 2 Drawing Figures

METHOD FOR REGULATING A POWER PLANT CONTAINING A GAS TURBINE ASSEMBLY AND APPARATUS FOR THE PERFORMANCE OF THE AFORESAID METHOD

BACKGROUND OF THE INVENTION

The present invention relates to a new and improved method of regulating a power plant containing a gas turbine assembly operated in an open cycle, the gas turbine assembly essentially comprising a compressor for the combustion air, a combustion chamber and a gas turbine, wherein a heat exchanger is arranged at the exhaust side of the gas turbine where there is utilized the thermal energy still contained in the exhaust gases of the gas turbine. The invention also relates to apparatus for the performance of the aforesaid method.

The temperature of the combustion gases at the inlet to a gas turbine is limited because of the material from which the gas turbine is constructed. This can be accomplished by the infeed of a considerable amount of excess air. In order not to exceed the dew point of the exhaust gases, a minimum exhaust gas temperature must be maintained in the flue, which, depending upon the sulphur content of the fuel, is approximately between 100° C. and 180° C. This leads to considerable thermal losses. At the maximum output of the gas turbine its thermal efficiency amounts to about 30% and the total utilization of the fuel, i.e., the generated output of the gas turbine plus the employed residual heat amounts to about 68% or 83% for exhaust gas temperatures in the flue of 180° C. and 100° C., respectively.

In order to reduce the generated electrical output for an open type gas turbine, at constant rotational speed (synchronous operation) the temperature of the combustion gas is lowered in front of the turbine by reducing the fuel infeed. This is associated with a reduction in the efficiency. Since, however, the combustion air-compressor delivers a practically constant quantity of air, the excess air of the combustion gases is still further increased in relation to that at full load operatin and, thus, there is further increased the exhaust gas losses per kilogram of fuel. With decrease of the inlet temperature to the gas turbine there, of course, also drops the exhaust temperature, and in conjunction therewith there also is reduced the useful temperature range of the exhaust gases. Hence, with decreasing output of the gas turbine there exists an increasingly poorer utilization of the fuel.

Another possibility is to open an exhaust valve at partial load and to exhaust excess air. However, with this procedure valuable energy is lost, likewise leading to a poorer utilization of the fuel.

It is for these reasons that the gas turbines of heating and power plants, where the waste heat is used for heating purposes, are generally operated at intermittent full load. A continuous operation, where full load and partial load continuously change and as the same is possible in the case of back-pressure-steam turbines or with closed-cycle gas turbines, cannot be recommended for economical and ecological reasons for open-cycle gas turbines.

In the case of power plants utilizing combined gas and steam-turbines, there is counteracted the impairment of the efficiency during partial load by additionally firing the boiler. With practically stoichiometric combustion, the excess air in the exhaust gases of the gas turbine is almost completely utilized. Nonetheless, even with these power plants the efficiency is quite considerably reduced with decreasing partial load.

SUMMARY OF THE INVENTION

Therefore, with the foregoing in mind, it is a primary object of the present invention to provide an improved method of, and apparatus for, regulating the operation of a power plant containing a gas turbine assembly in a manner not associated with the aforementioned drawbacks and limitations of the prior art proposals.

Another and more specific object of the present invention is directed to utilizing the thermal energy of the exhaust gases in a power plant having a gas turbine operated in an open cycle, and regulating the open cycle during partial load in a manner such that there is counteracted a reduction of the efficiency and the total utilization of the fuel is more efficient.

Now in order to implement these and still further objects of the invention which will become more readily apparent as the description proceeds, the method aspects of the present development contemplate that, for the purpose of regulating the gas turbine output, there is recycled into the flow path of the combustion air a variable quantity of compressed air to a stage working at lower pressure.

Not only is the invention concerned with the aforementioned method aspects, but also deals with apparatus for the performance thereof and contemplates a regulation apparatus which is manifested by the features that a return line or conduit controlled by a regulatable shut-off element serves to connect a stage of higher pressure with a stage of lower pressure in the flow path of the combustion air.

By employing the aforementioned regulation technique, the degree of utilization of the fuel—generated gas turbine output plus utilization of the thermal energy of the exhaust or waste gases—practically remains the same during idling of the gas turbine as during full load. This in effect means that the entire operating range can be carried out with almost constant economy. Furthermore, this regulation technique can be advantageously combined with other known regulation techniques. When such is combined with a regulation process for the purpose of maintaining constant the temperature of the combustion gases at the inlet of the gas turbine there beneficially results lower fatigue of the material during load change than is possible with a pure temperature regulation.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
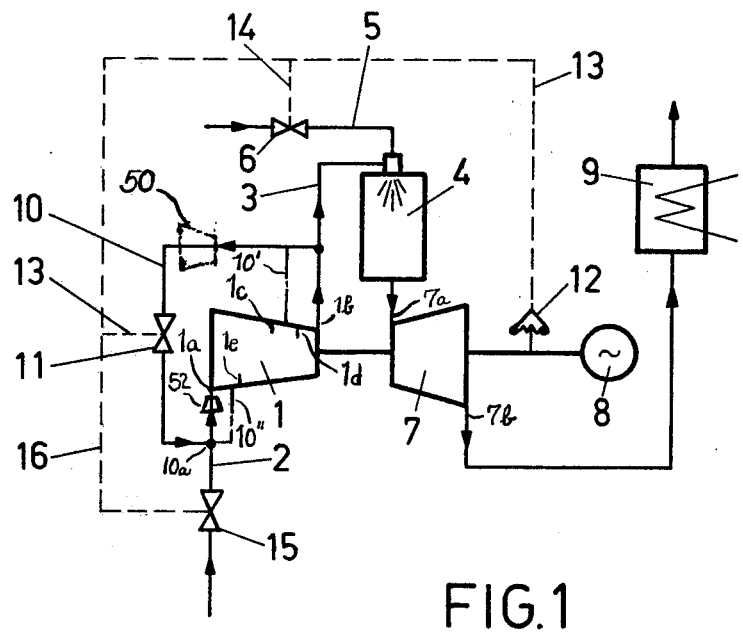
FIG. 1 schematically illustrates a power plant and associated regulation apparatus as contemplated by the present invention.

Describing now the drawings, in the showing of FIG. 1 there is illustrated a power plant having a compressor 1 which sucks-up combustion air through the infeed line or conduit 2 and delivers the compressed air through the pressure line 3 into a combustion chamber 4 into which there is supplied fuel by means of the line or conduit 5. In the illustrated exemplary embodiment the air is fed via infeed or suction line 2 into a low-pressure stage 1a of the compressor 1 and exits, after compression, from the high-pressure stage 1b of such compressor, flowing via line 3 to the combustion chamber 4. The quantity of infed fuel is regulated by a regulation valve 6. The combustion gases are discharged from the fuel chamber 4 into the gas turbine 7 at the high-pressure stage 7a and which turbine drives both the compressor 1 and for instance an electrical generator 8. The exhaust gases of the gas turbine 7 leave the turbine exhaust side 7b and flow through a heat exchanger 9 where there is delivered the major part of their thermal energy before these exhaust or waste gases are withdrawn through a conventional and therefore not particularly illustrated flue or the like. The heat exchange 9 is, for example, a boiler or the heat source for a distant heating system.

A return line or conduit 10 connects the pressure line 3 with the suction line or conduit 2, as shown. Its throughflow is controlled by a throttle valve 11 which is closed when the power plant is operating at full load.

The return line 10 with the interconnected throttle valve 11, which can be any regulatable shut-off element suitable for this purpose, renders possible regulation of the generated output of the gas turbine. In the case of decreasing output requirements, which would lead to an increase of the rotational speed of the gas turbine assembly, the rotational speed regulator 12 influences, by means of the therewith associated operating or control line 13, the throttle valve 11, resulting in partial or complete opening of such valve 11, so that a variable partial quantity of compressed air can flow out of the pressure line 3 back to the suction line 2. As a result, the operating point of the compressor 1 is shifted along its characteristic line in the direction of increased delivery capacity with smaller back-pressure, so that its power requirements only slightly change. Due to the lower final pressure of the compressor there is produced a corresponding lower pressure at the inlet 7a of the gas turbine 7, the absorption capacity of which drops approximately proportional to its inlet pressure. The gas throughput of the gas turbine which has been reduced in this manner and the reduced energy gradient owing to the pressure reduction now causes the output of the gas turbine to decrease. At the same time, there is, however, increased the exhuast gas temperature of the gas turbine, so that the useful thermal content of the exhaust gases which is available in the heat exchanger 9 in fact even increases notwithstanding a reduced throughput quantity.

The mixed temperature raised at the inlet 1a of the compressor 1, due to the return or feedback of the hot compressed air, reduces the air density, likewise reducing the pressure at the outlet 1b of the compressor. Hence, as calculations and tests have confirmed, it is sufficient if there is a return flow quantity of 12%, in order to reduce the output of the gas turbine to 50% of the full load.

Figure 2:
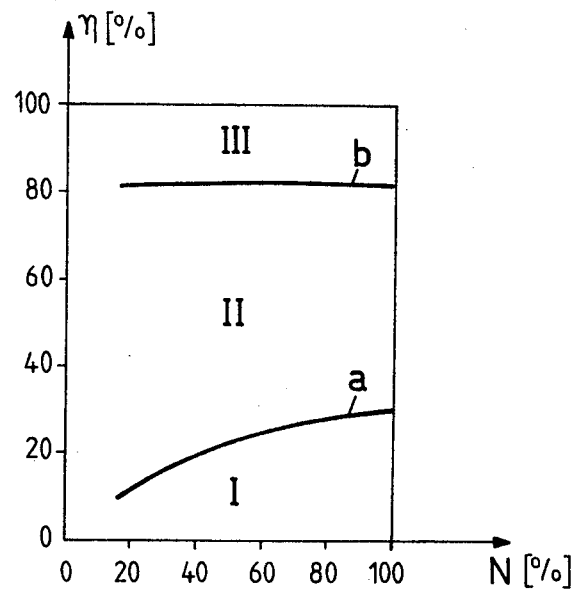
FIG. 2 illustrates graphs of the utilization of the fuel at different loads of the gas turbine.

The described partial load behavior of a power plant employing combined energy- and heat generation will be apparent from the graphic showing of FIG. 2. As a function of the gas turbine output N, which amounts to 100% at full load, the utilization of the fuel has been plotted in percentage. As will be seen from the curve a it mounts to about 30% at full load and reduces with decreasing partial load. The region or area I beneath the curve a represents the proportion of fuel which is used by the gas turbine.

If there is utilized the thermal energy or heat still contained in the exhaust gases of the gas turbine and if, in so doing, the exhaust gases are cooled to a temperature of about 100° C., then there is realized the area or region II which is smallest at full load of the gas turbine and increases with decreasing partial load. A summation of the areas I and II results in the curve b. It represents the total fuel utilization in percentage, which down to low partial loads of the gas turbine remains almost constant at 83%. The region III located thereabove represents the entire thermal losses.

If the system should be regulated to very small partial loads, then under certain circumstances there could result, due to the feedback of the compressed air, too high a temperature at the inlet 1a of the compressor 1. In this case there is useful a combination with another regulation technique. Thus, for instance, it is advantageous to regulate the output of the gas turbine from full load to half load by returning compressed air and from half load to idling by a temperature reduction in front of the gas turbine 7. Such regulation is not associated with any difficulties, since with the aid of the control line 14 which in operation is dependent upon the control line 13 (FIG. 1), it is possible to adjust the fuel valve 6, which normally serves the purpose of maintaining constant the temperature in front of the gas turbine.

Both of the mentioned regulation techniques also can be combined in such a manner that they are simultaneously employed or overlap in their effect at the region of a predetermined threshold or boundary value.

Instead of carrying out the temperature regulation it would also be possible at the lower partial loads to throttle the combustion air which is to be compressed. This is accomplished with the system shown in FIG. 1 by means of the throttle element 15 which can be controlled by the control line 16. This throttle element 15 can be arranged both forwardly of as well as after the opening or mouth 10a of the return line or conduit 10 into the suction line 2.

Such a throttle element of course has the drawback that due to the large suction volume it also requires correspondingly large dimensions and adjustment or setting forces. Furthermore, too rapid throttling could damage the compressor. Also with this combined regulation technique the effective regions of both individual methods can be designed in the manner as has been explained previously in conjunction with the temperature regulation.

Instead of receiving the regulation pulses or commands from a rotational speed regulator the regulation pulses also can be delivered by a pressure monitor or a power output monitor. In principle, it is also possible to manually actuate all of the throttle- or shut-off elements.

The described regulation method is most effective if the return line or conduit 10 leading from the pressure line 3 branches-off between the compressor 1 and the fuel chamber 4 and opens into the suction line 2 of the compressor. Further possibilities which are available is to have the return line branch-off between two neighboring stages of the compressor or to open at one such location, such as schematically indicated by the line 10' branching-off between the compressor stages 1c and 1d, and by the line 10'' opening between the compressor stages 1a and 1e. In both of the last-mentioned cases, the effect is correspondingly reduced due to the lower pressure gradient prevailing between the branched-off location and the opening or mouth location.

In order to reduce the energy losses, it is advantageous to utilize the energy contained in the returned or fedback air. This energy can be converted, for instance, into work in that there is incorporated into the return line an expansion or relaxation turbine, as generally indicated by reference character 50. This is especially then advantageous where the complete pressure gradient is available between the pressure line and suction line of the compressor. The relaxation turbine can be employed for any useful work output. If it is intended to assist in driving the electrical generator 8 of the gas turbine assembly, then it should be connected therewith by means of a suitable disengageable coupling, since it is only acted upon during partial load and need not be unnecessarily entrained at full load.

The energy contained in the returned air can also be employed for acceleration of the air which is to be compressed, in that the return line opens into an injector or nozzle device which is arranged in the flow path of the combustion air. This injector device can be arranged either in the suction line 2 of the compressor, as has been shown by way of example by reference character 52, as well as also between two neighboring compressor stages. In this way, the thermodynamic losses of the air flow are reduced. When infeeding the hot returned air into the suction line there is obtained an intensive admixing with the cold fresh air without resorting to any further measures, likewise contributing to an improvement in the process.

Finally, it is still here mentioned that the described regulation method can be employed in all instances for pure gas turbine processes and for combined gas- and steam processes, and it is immaterial whether the gas turbine serves for generating current or for other work, for instance, for the direct drive of a blast-furnace blower.

While there are shown and described present preferred embodiments of the invention, it is to be distinctly understood that the invention is not limited thereto, but may be otherwise variously embodied and practiced within the scope of the following claims. Accordingly,

What I claim is:

1. A method of regulating a combined power and heat generating plant comprising a gas turbine assembly operated in an open cycle, the gas turbine assembly comprising a compressor for the combustion air, a fuel chamber and a gas turbine, a heat exchanger arranged at the exhaust gas side of the gas turbine in which there is utilized the thermal energy still contained in the exhaust gases of the gas turbine for heating purposes, the improvement which comprises the steps of:
   returning a variable quantity of air heated by the compressor back through a return flow path for the combustion air to a location in front of the compressor, in order to regulate the heating output of the heat exchanger by the exhaust gases of the gas turbine; and
   at least partially reducing the pressure energy contained in the heated air by feeding the returned air through an expansion turbine arranged in the return flow path.

2. An apparatus for regulating a combined power and heat generating plant, comprising:
   a gas turbine assembly operated in an open cycle;
   said gas turbine assembly comprising:
      a compressor for the combustion air moving along a predetermined flow path;
      a combustion air infeed line provided for the compressor;
      means defining a fuel chamber;
      a pressure line leading from the compressor to said fuel chamber;
      a gas turbine having an exhaust gas side;
   a heat exchanger arranged after the exhaust gas side of the gas turbine where there is utilized the heat still contained in the exhaust gases of the gas turbine for heating purposes;
   means for regulating the output of the gas turbine;
   said regulating means comprising:
      a return line for air acted upon by said compressor;
      a regulatable shut-off element for controlling said return line;
      said return line extending between said pressure line and said combustion air infeed line for the compressor;
      an expansion turbine arranged at said return line;
   said regulating means accomplishing an at least partial absorption of the pressure energy of the air returned by said return line and regulating the delivery of heat to the air in the combustion air infeed line.

3. The apparatus as defined in claim 2, further including:
   injector means into which opens the return line for accelerating the air to be compressed;
   said injector means being arranged in the flow path of the combustion air.

4. The apparatus as defined in claim 2, wherein:
   said compressor has two neighboring stages;
   said return line branching-off between said two neighboring stages of the compressor.

5. In a method for regulating a power plant comprising a gas turbine assembly operated in an open cycle, the gas turbine assembly essentially comprising a compressor for the combustion air, a fuel chamber and a gas turbine, a heat exchanger arranged at the exhaust gas side of the gas turbine in which there is utilized the thermal energy still contained in the exhaust gases of the gas turbine, the improvement which comprises:
   regulating the gas turbine output by returning into the flow path of the combustion air a variable quantity of compressed air to a stage operating at lower pressure; and
   with decreasing output requirements carrying out the steps of:
      initially increasing the returned quantity of compressed air; and
      during further decrease of the output requirements below a predetermined threshold value reducing the temperature in front of the gas turbine.

6. In a method for regulating a power plant comprising a gas turbine assembly operated in an open cycle, the gas turbine assembly essentially comprising a compressor for the combustion air, a fuel chamber and a gas turbine, a heat exchanger arranged at the exhaust gas side of the gas turbine in which there is utilized the thermal energy still contained in the exhaust gases of the gas turbine, the improvement which comprises:
   regulating the gas turbine output by returning into the flow path of the combustion air a variable quantity of compressed air to a stage operating at lower pressure; and with decreasing output requirements carrying out the steps of:
 initially increasing the returned quantity of compressed air; and
 with further decrease of the output requirements below a predetermined threshold value throttling the combustion air which is to be compressed.

* * * * *